United States Patent
McElroy et al.

(10) Patent No.: US 6,519,872 B2
(45) Date of Patent: Feb. 18, 2003

(54) CAR WASH BLOWER RETRACT SYSTEM

(75) Inventors: Timothy Patrick McElroy, Glendale, AZ (US); Christopher Patrick McElroy, Glendale, AZ (US); Lucian G. McElroy, Carefree, AZ (US)

(73) Assignee: Proto-vest, Inc., Glendale, AR (US)

( * ) Notice: Subject to any disclaimer, the term of this patent is extended or adjusted under 35 U.S.C. 154(b) by 55 days.

(21) Appl. No.: 09/849,165

(22) Filed: May 4, 2001

(65) Prior Publication Data

US 2002/0162245 A1 Nov. 7, 2002

(51) Int. Cl.[7] .................................................. F26B 19/00
(52) U.S. Cl. .............................. 34/666; 34/216; 34/222; 34/229; 15/319
(58) Field of Search .......................... 34/666, 202, 216, 34/217, 222, 223, 224, 229, 209, 487, 488, 510; 15/302, 316.1, 319

(56) References Cited

U.S. PATENT DOCUMENTS

| | | | | |
|---|---|---|---|---|
| 2,440,157 A | | 4/1948 | Rousseau | 34/229 |
| 3,224,108 A | * | 12/1965 | Flaming | 34/87 |
| 3,279,093 A | | 10/1966 | Dutton | 34/229 |
| 3,765,104 A | | 10/1973 | Takeuchi | 34/229 |
| 3,780,448 A | * | 12/1973 | Von Kulmer | 34/229 |
| 3,803,727 A | * | 4/1974 | Takeuchi | 34/229 |
| 3,994,041 A | * | 11/1976 | Barber | 15/302 |
| 4,335,526 A | | 6/1982 | Smith | 34/229 |
| 4,472,889 A | * | 9/1984 | Hanna | 34/229 |
| 4,559,721 A | * | 12/1985 | Hanna | 34/229 |
| 4,563,788 A | | 1/1986 | Kobayashi | 15/312 |
| 4,683,668 A | | 8/1987 | Hondzinski et al. | 34/229 |
| 4,730,401 A | | 3/1988 | Machin | 34/43 |
| 4,872,238 A | | 10/1989 | Crotts et al. | 15/302 |
| 5,048,147 A | | 9/1991 | Belanger et al. | 15/319 |
| 5,367,739 A | | 11/1994 | Johnson | 15/316.1 |
| 5,421,102 A | | 6/1995 | McElroy et al. | 34/541 |
| 5,596,818 A | | 1/1997 | Jones | 34/666 |
| 5,749,161 A | | 5/1998 | Jones | 34/541 |
| 5,755,043 A | * | 5/1998 | Belanger et al. | 34/666 |
| 5,901,461 A | | 5/1999 | McElroy et al. | 34/233 |
| 5,960,564 A | | 10/1999 | McElroy et al. | 34/666 |
| 6,021,584 A | | 2/2000 | Schwartz | 34/666 |
| 6,389,640 B1 | * | 5/2002 | Decker et al. | 15/316.1 |

* cited by examiner

Primary Examiner—Ira S. Lazarus
Assistant Examiner—K. B. Rinehart
(74) Attorney, Agent, or Firm—Howard & Howard

(57) ABSTRACT

A plurality of pairs of telescoping tubes (20) and (22) interconnect a support plenum (12) and a nozzle system (14) for delivering air from the plenum (12) to the nozzle system (14) while allowing the nozzle system (14) to move in an adjustment direction toward and away from the plenum (12). The nozzle system (14) is elongated and includes a fixed shell (24) and a movable shell (26) movably supported by the fixed shell (24). The assembly (10) is characterized by actuators (42) for moving the nozzle system (14) between the various vertical-operating positions and a motor (46) for rotating the nozzle (16). The nozzle system (14) may be moved up and down to accommodate the changing longitudinal configuration of the vehicle (18) and the nozzle (16) may be rotated about the nozzle axis to efficiently direct air against the contour of the vehicle (18).

9 Claims, 3 Drawing Sheets

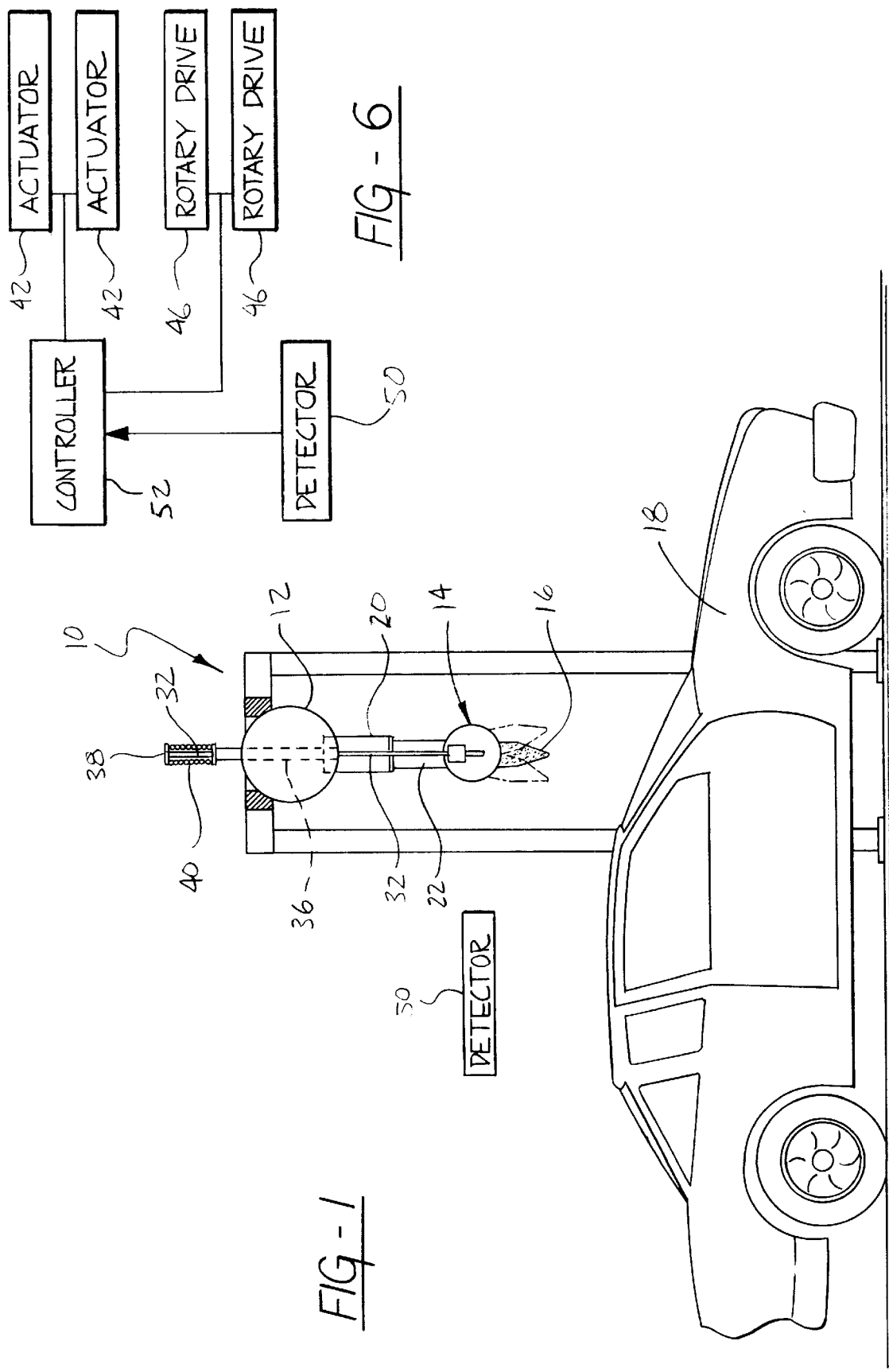

CAR WASH BLOWER RETRACT SYSTEM

BACKGROUND OF THE INVENTION

1. Field of the Invention

The subject invention relates to an assembly for blowing liquids from the surface of a vehicle in a car wash.

2. Description of the Prior Art

Assemblies for blowing liquids from a vehicle typically include a support plenum for distributing air and a nozzle system including a nozzle for directing air toward the top of a vehicle. Examples of such assemblies are disclosed in U.S. Pat. Nos. 5,421,102; 5,901,461 and 5,960,564, all in the name of McElroy et al and assigned to the assignee of the subject invention.

Many assemblies include an air delivery conduit interconnecting the plenum and the nozzle system for delivering air from the plenum to the nozzle system while allowing the nozzle system to move in an adjustment direction toward and away from the plenum between various vertical-operating positions. Examples of such systems are disclosed in U.S. Pat. Nos. 2,440,157 to Rousseau and 3,765,104 to Takeuchi. Yet other assemblies rotate the nozzle to different directions as the vehicle moves therepast. Examples of such assemblies are disclosed in U.S. Pat. Nos. 3,279,093 to Dutton; 4,730,401 to Machin; 5,367,739 to Johnson; 5,596,818 to Jones; and 5,749,161 to Jones.

However, todate these features have been mutually exclusive of one another.

SUMMARY OF THE INVENTION AND ADVANTAGES

The subject invention fills this need and provides an assembly having both features.

The invention provides an assembly for blowing liquids from a vehicle comprising a support plenum for distributing air, a nozzle system including a nozzle for directing air toward the top of a vehicle, and an air delivery conduit interconnecting the plenum and the nozzle system for delivering air from the plenum to the nozzle system while allowing the nozzle system to move in an adjustment direction toward and away from the plenum between various vertical operating positions. The assembly is characterized by a mechanism for moving the nozzle system between the various operating positions and for rotating the nozzle about a nozzle axis extending transversely to the adjustment direction.

Accordingly, the assembly includes a nozzle system that may be moved up and down to accommodate the changing longitudinal configuration of a vehicle and the nozzle may be rotated about the nozzle axis to efficiently direct air against the contour of the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1 is a side view showing the subject invention relative to a vehicle;

FIG. 6 is schematic view of the control system use to control the movement of the subject invention.

DETAILED DESCRIPTION OF THE PREFERRED EMBODIMENT

Referring to the Figures, wherein like numerals indicate like or corresponding parts throughout the several views, an assembly for blowing liquids from a vehicle is generally shown at 10.

The assembly comprises a support plenum 12 for distributing air. A nozzle system is generally indicated at 14 and includes a nozzle 16 for directing air toward the top of a vehicle 18. The nozzle 16 comprises a flexible material, such as a fabric as is well known in the art.

Figure 3:
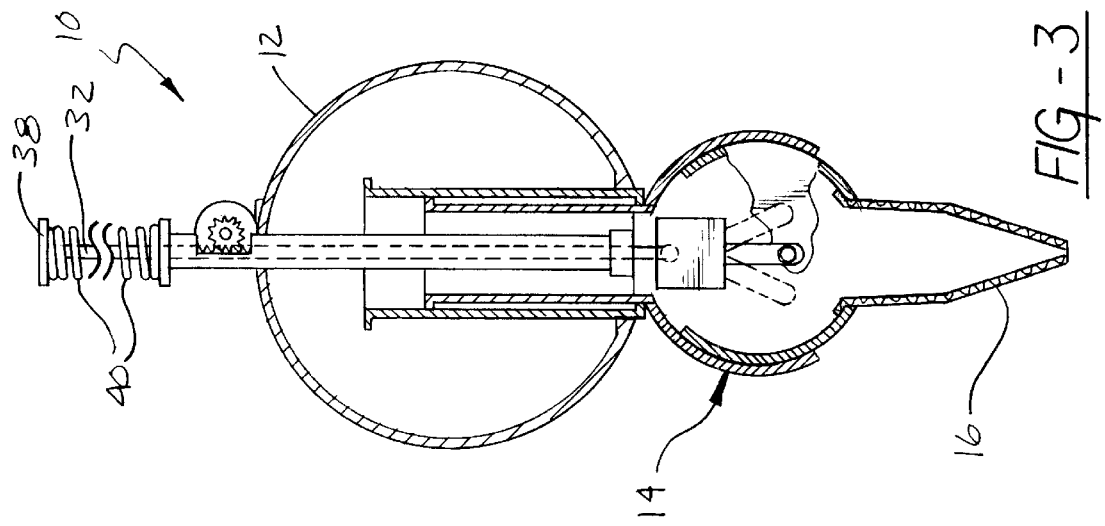
FIG. 3 is a view similar to FIG. 1 but showing the invention in the retracted position.
Figure 2:
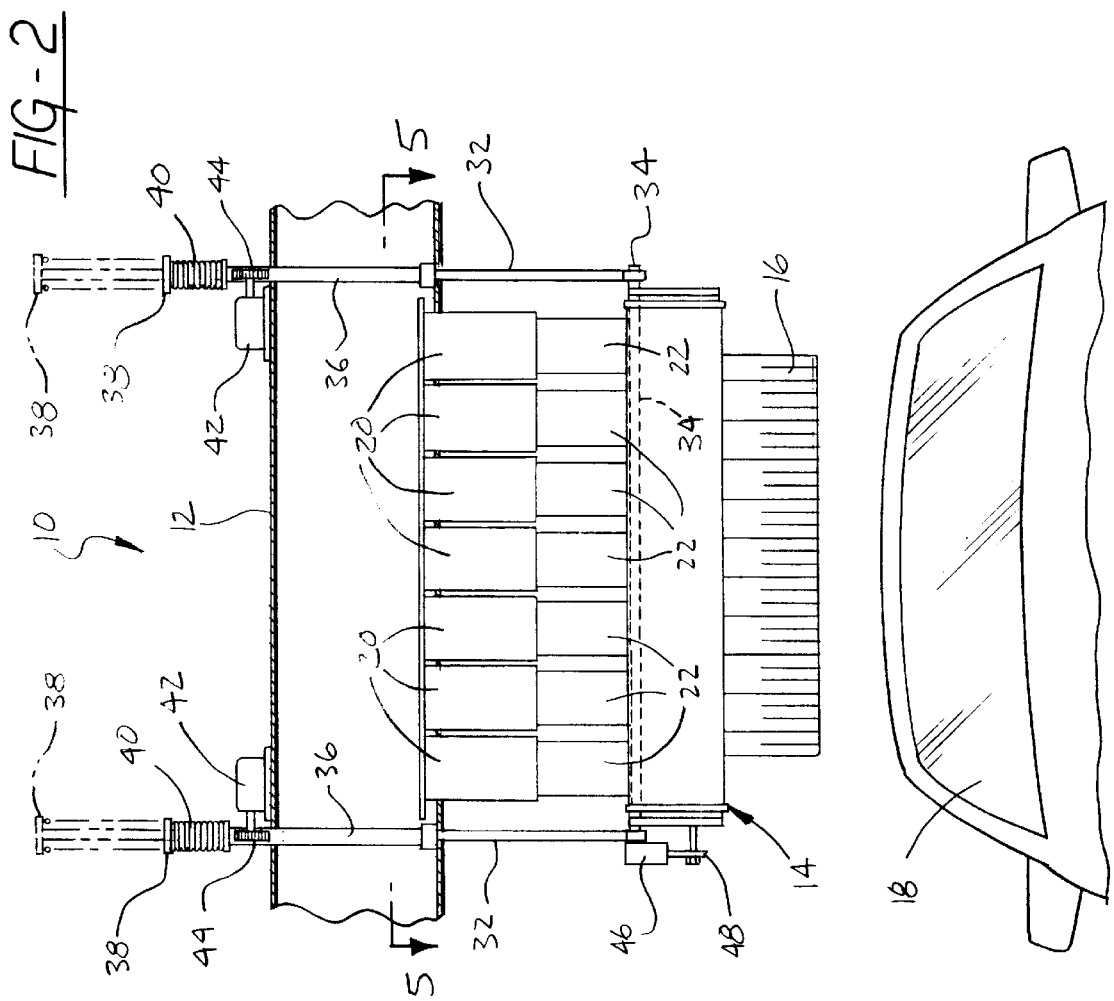
FIG. 2 is a frontal view of the vehicle and the subject invention.
Figures 4, 5:
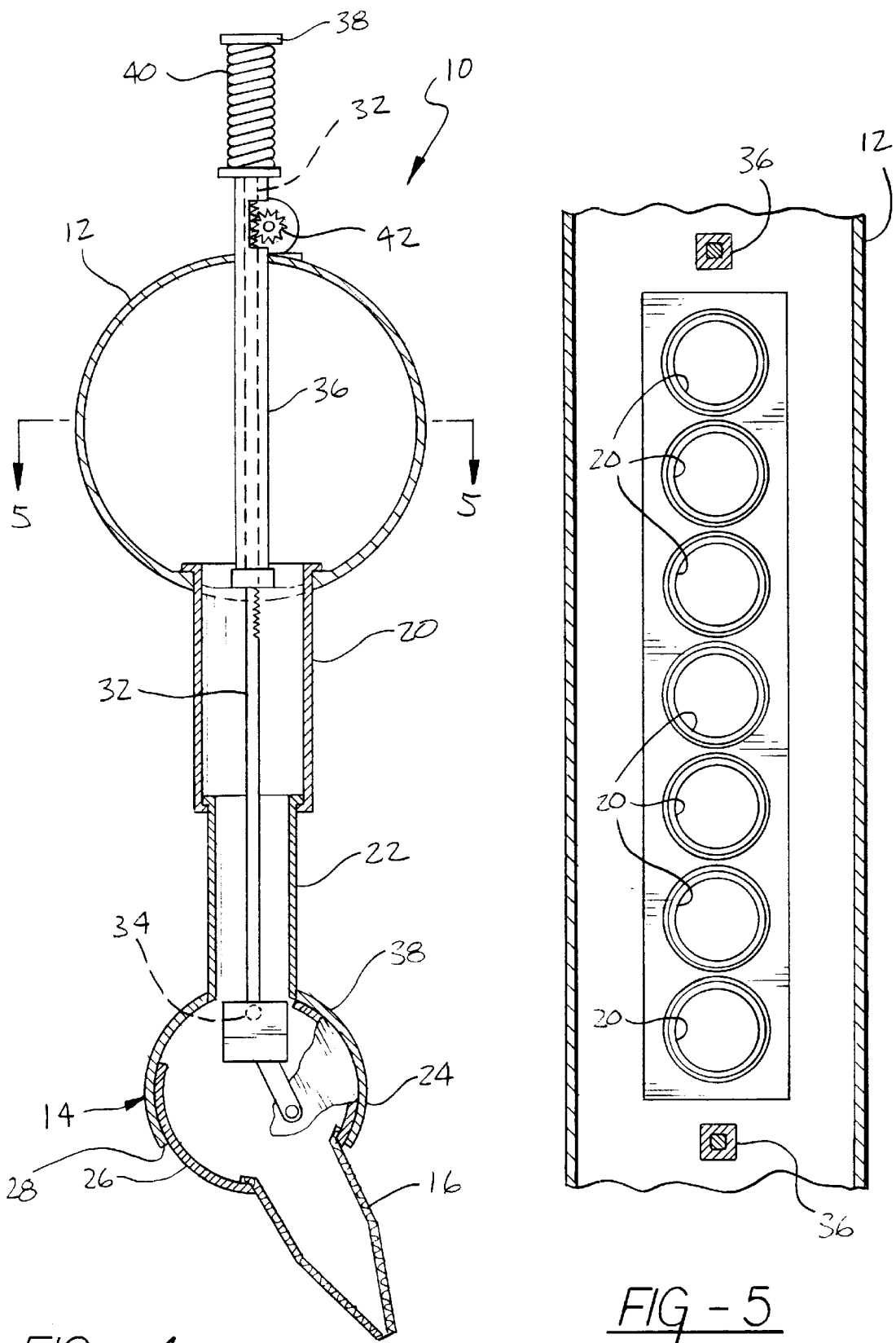
FIG. 4 is an enlarged end view of the subject invention.
FIG. 5 is a cross sectional taken along line 5—5 of FIG. 2.

An air delivery conduit, including a plurality of pairs of telescoping tubes 20 and 22, interconnects the plenum 12 and the nozzle system 14 for delivering air from the plenum 12 to the nozzle system 14 while allowing the nozzle system 14 to move in an adjustment direction toward and away from the plenum 12 between various vertical operating positions, as illustrated by comparing FIGS. 1 and 3. The telescoping tubes 20 and 22 include a base tube 20 extending from the support plenum 12 and a movable tube 22 in telescoping relationship with the base tube 20 and attached to the nozzle system 14. The tubes 20 and 22 are rigid and self-supporting and may be made of various materials such as metal or plastic. The tubes 20 and 22 are circular in cross section, as shown in FIG. 5, and have a close or airtight fit. There may be a sliding seal incorporated between the tubes 20 and 22 to effect an air tight seal to prevent the leakage of air as the movable tubes 22 are moved into and out of the fixed or base tubes 20. The base tubes 20 are welded or otherwise fastened to the support plenum 12.

The nozzle system 14 is elongated and includes a fixed shell 24 and a movable shell 26 movably supported by the fixed shell 24. The movable tubes 22 are attached to the fixed shell 24 by welding or fasteners. The inner or movable shell 26 is rotatably supported within the fixed shell 24 as the fixed shell 24 has an elongated opening 28 along the bottom for the passage of air into the nozzle 16 and the movable shell 26 has an elongated opening 30 along the top to accommodate the rotational movement of the movable shell 26 about a nozzle axis which is at the center of the circular shells 24 and 26.

The assembly 10 is characterized by a mechanism for moving the nozzle system 14 between the various operating positions and for rotating the nozzle 16 about the nozzle axis extending transversely to the adjustment direction whereby the nozzle system 14 may be moved up and down to accommodate the changing longitudinal configuration of the vehicle 18 and the nozzle 16 may be rotated about the nozzle axis to efficiently direct air against the contour of the vehicle 18. More specifically, the mechanism includes an actuator for moving the nozzle system 14 between the operating positions. The nozzle system 14 is suspended by hanger rods 32 which are attached to a cross bar 34, the cross bar 34 supporting the fixed shell 24. The hanger rods 32 extend upwardly through guides 36 to an upper end 38 and a spring 40 reacts between that upper end 38 and the top of the guides 36 to lift the nozzle system 14 in the event of loss of power, or the like. The actuator also includes the drive motors 42 that rotate gears 44 in meshing engagement with rack teeth on the rods 32. Upon actuation of the drive motors 42, the gears 44 drive the rods up and down, depending upon the direction of rotation, to move the nozzle system 14 up and down.

The mechanism also includes a rotary drive 46 for rotating the nozzle 16 about the nozzle axis. The rotary drive 46 may take various forms including a motor to rotate a crank arm 48 to oscillate the outer or movable shell back and forth about the nozzle axis.

The assembly also includes a detector 50 for detecting the contour of the vehicle 18. The detector may take any one of various forms well known in the art for sensing the position of the vehicle contour. A controller 52 is included for initiating the actuator 42 and the rotary drive 46 in response to the detector 50 for positioning the nozzle system 14 relative to the surface of the vehicle 18.

In the event of failure of the control system, the assembly includes a biasing system for automatically retracting the nozzle system 14 toward the support plenum 12 in response to loss of control by the actuator 42. That biasing system, as illustrated, comprises the aforementioned springs 40 that react between the top of the support plenum 12 and the enlarged upper ends 38 of the rods 36.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. An assembly for blowing liquids from a vehicle comprising;

a support plenum (12) for distributing air, a nozzle system (14) including a nozzle (16) for directing air toward the top of a vehicle, a pair of telescoping tubes (20, 22) interconnecting said plenum (12) and said nozzle system (14) for delivering air from said plenum (12) to said nozzle system (14) while allowing said nozzle system (14) to move in an adjustment direction toward and away from said plenum (12) between various vertical operating positions, said telescoping tubes (20, 22) including a base tube (20) extending from said support plenum (12) and a movable tube (22) in telescoping relationship with said base tube (20) and attached to said nozzle system (14), a mechanism for moving said nozzle system (14) between said various operating positions and for rotating said nozzle (16) about a nozzle axis extending transversely to said adjustment direction whereby said nozzle system (14) may be moved up and down to accommodate the changing longitudinal configuration of a vehicle (18) and said nozzle (16) may be rotated about said nozzle axis to efficiently direct air against the contour of the vehicle (18).

2. An assembly as set forth in claim 1 wherein said mechanism includes an actuator (42) for moving said nozzle system (14) between said operating positions.

3. An assembly as set forth in claim 2 wherein said mechanism includes a rotary drive (46) for rotating said nozzle (16) about said nozzle axis.

4. An assembly as set forth in claim 3 including a detector (50) for detecting the contour of a vehicle (18).

5. An assembly as set forth in claim 4 including a controller (52) for initiating said actuator (42) and said rotary drive (46) in response to said detector (50) for positioning said nozzle system (14) relative to the surface of a vehicle (18).

6. An assembly as set forth in claim 2 including a biasing system (40) for automatically retracting said nozzle system (14) toward said support plenum (12) in response to loss of control by said actuator (42).

7. An assembly as set forth in claim 1 wherein said nozzle system (14) includes a fixed shell (24) and a movable shell (26) movably supported by said fixed shell (24), said movable tube (22) being attached to said fixed shell (24).

8. An assembly as set forth in claim 7 wherein said nozzle (16) comprises a flexible material.

9. An assembly as set forth in claim 8 wherein said nozzle system (14) is elongated and including a plurality of said telescoping tubes (20, 22).

* * * * *